(12) United States Patent
Chainani et al.

(10) Patent No.: US 12,411,863 B1
(45) Date of Patent: Sep. 9, 2025

(54) PRIVATELY SHARING DATABASE DATA ACROSS PROVIDER NETWORK REGIONS

(71) Applicant: Amazon Technologies, Inc., Seattle, WA (US)

(72) Inventors: Naresh Chainani, Mountain View, CA (US); Jingyi Qing, Newcastle, WA (US); Dengfeng Li, Sunnyvale, CA (US); John Thomas, Redwood City, CA (US); Ippokratis Pandis, Menlo Park, CA (US); Eric Ray Hotinger, Redmond, WA (US); William Michael McCreedy, Berlin (DE); Vivek Ramamoorthy, Sammamish, WA (US); Monish Gupta, Cupertino, CA (US); Naga Raju Bhanoori, Santa Clara, CA (US); Sushim Mitra, Sunnyvale, CA (US); Mohammad Foyzur Rahman, Newark, CA (US); Pavel Sokolov, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,414

(22) Filed: Dec. 10, 2021

(51) Int. Cl.
*G06F 16/25* (2019.01)
*G06F 16/22* (2019.01)
*G06F 16/2452* (2019.01)
*G06F 16/2457* (2019.01)

(52) U.S. Cl.
CPC ........ *G06F 16/258* (2019.01); *G06F 16/2282* (2019.01); *G06F 16/24524* (2019.01); *G06F 16/24573* (2019.01); *G06F 16/252* (2019.01)

(58) Field of Classification Search
CPC ............ G06F 16/258; G06F 16/24573; G06F 16/2282; G06F 16/24524; G06F 16/252; H04L 63/00
See application file for complete search history.

(56) References Cited

U.S. PATENT DOCUMENTS

| | | |
|---|---|---|
| 7,630,986 B1 | 12/2009 | Herz |
| 9,401,918 B2 | 7/2016 | Lu et al. |
| 9,639,562 B2 | 5/2017 | Raitto et al. |
| 9,705,888 B2 | 7/2017 | McAlister |
| 9,984,139 B1 | 5/2018 | Ye |
| 10,628,566 B2 | 4/2020 | Hoffmann et al. |
| 10,706,165 B2 | 7/2020 | Lin |

(Continued)

OTHER PUBLICATIONS

U.S. Appl. No. 17/548,283, filed Dec. 10, 2021, Vladimir Ponomarenko, et al.

(Continued)

*Primary Examiner* — William P Bartlett
(74) *Attorney, Agent, or Firm* — S. Scott Foster; Kowert, Hood, Munyon, Rankin & Goetzel, P.C.

(57) ABSTRACT

Database data of a database service may be privately shared across provider network regions. A database producer can authorize an account of to access a database in another region of the provider network. The consumer of the database can associate the database in order to accept the permission to access the database. The database can then be created as an external table at a consumer database engine and metadata for the database privately shared between producer and consumer database engines that can be used to query the external table.

20 Claims, 12 Drawing Sheets

(56) References Cited

U.S. PATENT DOCUMENTS

| | | |
|---|---|---|
| 10,834,055 B2 | 11/2020 | Moysi et al. |
| 11,086,841 B1 | 8/2021 | Cseri et al. |
| 11,138,190 B2 | 10/2021 | Muralidhar et al. |
| 11,163,757 B2 | 11/2021 | Muralidhar et al. |
| 2011/0219028 A1 | 9/2011 | Dove |
| 2012/0320788 A1 | 12/2012 | Venkataramanan |
| 2014/0173702 A1 | 6/2014 | Wong et al. |
| 2015/0019727 A1* | 1/2015 | Parakh ............... H04L 67/1004 |
| | | 709/225 |
| 2015/0135272 A1* | 5/2015 | Shah ..................... H04L 63/08 |
| | | 726/4 |
| 2015/0319156 A1 | 11/2015 | Guccione et al. |
| 2017/0116335 A1* | 4/2017 | Baby ....................... G06F 8/65 |
| 2017/0124170 A1 | 5/2017 | Koorapati |
| 2018/0302399 A1* | 10/2018 | Khanduja .............. H04L 67/10 |
| 2019/0095835 A1 | 3/2019 | Jarvis et al. |
| 2019/0238199 A1 | 8/2019 | Lupper |
| 2019/0278746 A1 | 9/2019 | Cree |
| 2020/0067933 A1* | 2/2020 | Kukreja ................ H04L 63/104 |
| 2020/0073644 A1* | 3/2020 | Shankar .............. G06F 11/3664 |
| 2020/0076789 A1* | 3/2020 | Hanlon .................. H04L 63/20 |
| 2021/0044571 A1* | 2/2021 | Costa .................. H04L 63/0807 |
| 2021/0096958 A1 | 4/2021 | Kumar |
| 2022/0329540 A1* | 10/2022 | Tangirala ............... H04L 45/02 |
| 2022/0335049 A1 | 10/2022 | Hacigumus |
| 2022/0414253 A1* | 12/2022 | Aldrich ................ G06F 16/248 |
| 2023/0081067 A1 | 3/2023 | Mittal |
| 2023/0098484 A1 | 3/2023 | van den Dungen |

OTHER PUBLICATIONS

U.S. Appl. No. 17/548,406, filed Dec. 10, 2021, Ippokratis Pandis, et al.

* cited by examiner

Create, by a consumer database engine hosted in a first region of a provider network, a database, managed by a producer database engine hosted in a second region of a provider network, as an external database accessible via the producer database engine, the consumer database engine being associated with the database to grant permission to the consumer database engine to access the database
810

Obtain, by the consumer database engine via private network communications between the first region and the second region of the provider network, metadata describing the database from the producer database engine and an access credential to access the database
820

Perform, by the consumer database engine, a query to the external database received at the consumer database engine using the metadata and the access credential
830

*FIG. 8*

PRIVATELY SHARING DATABASE DATA ACROSS PROVIDER NETWORK REGIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

BRIEF DESCRIPTION OF THE DRAWINGS

FIG. 8 is a high-level flowchart illustrating methods and techniques to implement privately sharing database data across provider network regions, according to some embodiments.

Figure 1:
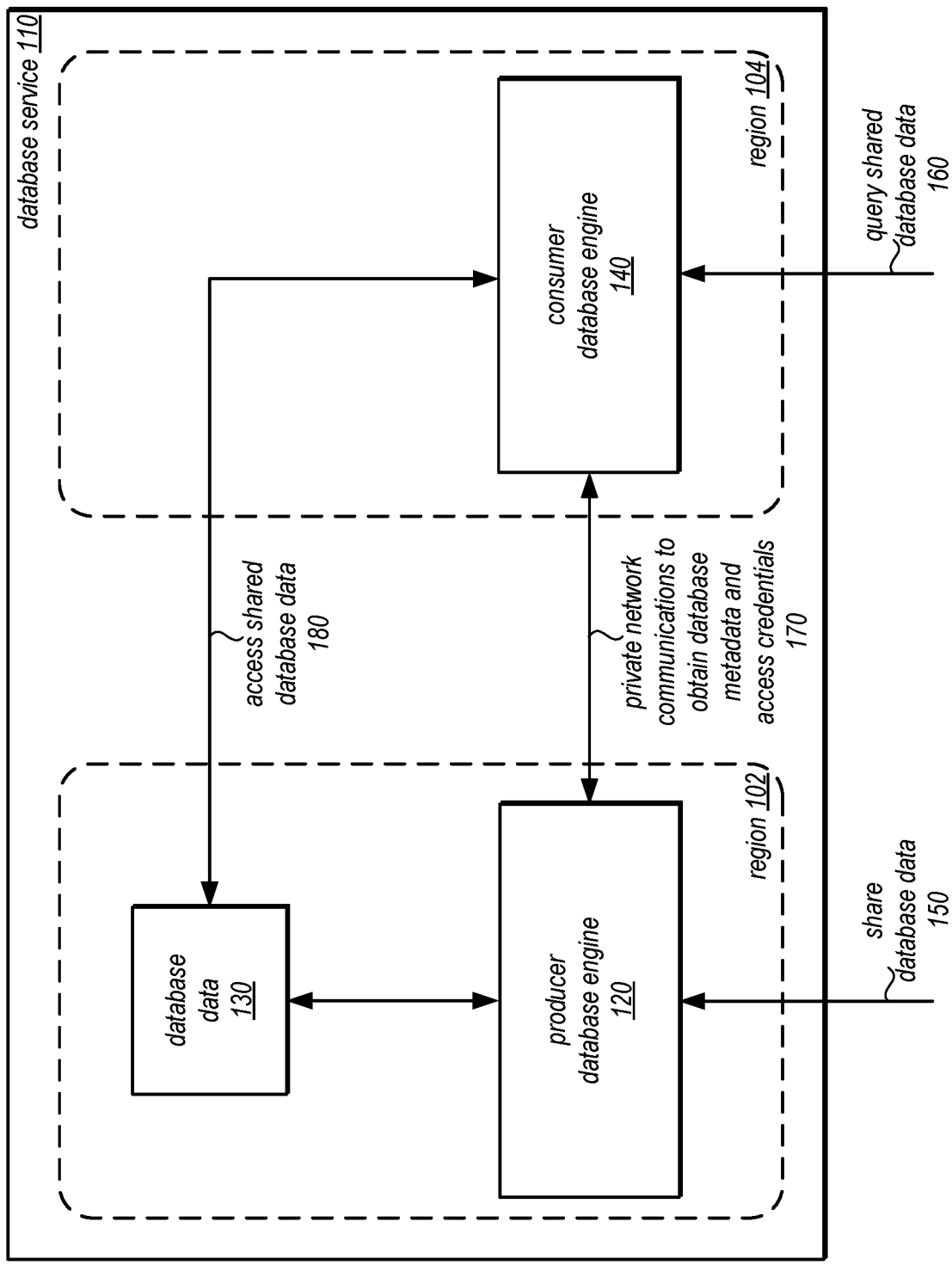
FIG. 1 illustrates a logical block diagram illustrating privately sharing database data across provider network regions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of privately sharing database data across provider network regions, according to some embodiments are described herein. By virtue of storing different data, different databases can provide insights for analysis, state information for products, processes, or systems, or any other use case for a database. While database migration and other data transmission techniques exist to copy a database from one location to another in order to grant other entities access to the database, such techniques do not offer the producer of the database control over the dissemination of database data. Instead, once copied it can be difficult to ensure the accuracy of, or limit the use of, the database data. Moreover, a copy of the database may be a snapshot or version of the database at a point in time. Changes to the database that occur after the migration of the database would not be incorporated into the database without having to obtain another copy of the database. Techniques for privately sharing database data can remove impediments to sharing database data, by maintaining control over access to a database (by retaining control over access to metadata for the database and the database data itself) and allowing for the database data to be provided in a consistent state for shared database consumers.

Privately sharing database data can also be implemented to overcome geographical challenges in the distribution of data. A database stored and managed in one area (e.g., on one continent, such as Europe) may be desirably accessed in another continent (e.g., South America). In order to maintain both the control over database data and the consistency of database data, techniques for privately sharing database data across provider network regions, which may, for example, allow for a European region to share data with a South American region.

FIG. 1 illustrates a logical block diagram illustrating privately sharing database data across provider network regions, according to some embodiments. Database service 110 may be a stand-alone database service, in various embodiments. For example, database service 110 may be implemented for private use (e.g., on private networks and resources for entity-specific utilization). In some embodiments, database service 110 may be implemented as part of multiple different services provided by a cloud service provider across multiple regions, such as provider network 200 discussed in detail below with regard to FIG. 2.

Database service 110 may manage databases on behalf of clients of database service 110, in various embodiments. For example, database service 110 may implement an interface that allows users to create a database to be hosted in database service 110. The interface may also allow users to specify whether the database is to be managed by the database service, automatically, in a "serverless" fashion (e.g., by allowing database service 110 to automatically determine and configure an appropriate number of computing resources to host and provide access to (e.g., query) the database). In some embodiments, the interface may support management parameters or other information to guide the management of the database, such as a parameter indicating that query performance should be prioritized over resource efficiency (e.g., lower cost), or parameter to indicate that resource efficiency should be prioritized over query performance. In some embodiments, database service 110 may also allow for hosted databases to be manually managed by a user (e.g., via interface requests to configure a specified number of computing resources to host and provide access to (e.g., query) the database), increase or decrease the number of computing resources, and so on.

Database service 110 may be implemented across different regions, such as regions 102 and 104, in order to provide access to database service 110 in different locations. Regions, as discussed in detail below with regard to FIG. 2, may be separate geographical areas in which the provides data centers. Client applications can connect to regions via a publicly accessible network (e.g., the Internet, a cellular communication network). Regions may be connected to a global network which includes private networking infrastructure (e.g., fiber connections controlled by the database service) connecting each region to at least one other region. This compartmentalization and geographic distribution of computing hardware enables the database service 110 to provide low-latency resource access to customers on a global scale with a high degree of fault tolerance and stability.

A database may be created and hosted in a region. For example, a database may be created and hosted in region 102. Database data 130 may be stored for the database in a data storage system (e.g., remote or attached to producer database engine). Database service 110 may implement a database engine 120 (e.g., one or more computing resources, such as a processing cluster discussed in detail below with regard to FIG. 5), which may manage and provide access to the database data 130. As discussed above, it may be desirable to share a database for use by other database engines. Thus the database engine 120 may receive a request to share database data, as indicated 150. This makes database engine 120 have the role of "producer" for database data (e.g., as data may be added or removed to database data 130 via producer database engine 120). As discussed in detail below with regard to FIGS. 7-9, sharing the database may create a "datashare" object (e.g., a logical object, such as an identifier for the datashare allowing the datashare to be referenced in various requests to manage or access the datashare).

Database data 130 may be stored and organized into one or more schemas (e.g., for one or more database tables). These schemas may indicate how to interpret database data 130 at a database engine (e.g., at producer database engine 120 or consumer database engine 140), such as by indicating what type of data is stored in a column, feature, or other attribute of database data. Other metadata may be used to access database data. For example, various statistics that describe the contents of database data (e.g., histograms of data values, minimum and maximum values, etc.) may also be stored as part of metadata. In some embodiments, the metadata may be organized in various data objects, such as a superblock, which may map portions of metadata to one (or more) data blocks in database data 130.

Once database data is shared, the metadata to access the database may be obtained. For example, consumer database engine 140 implemented in region 104, may be a database engine that has been authorized to access the shared database data (as discussed in detail below with regard to FIGS. 7-10). In some embodiments, database service 110 (or provider network 200) may implement accounts as an access control mechanism so that producer database engine 120 may be associated with one account and consumer database engine 140 may be associated with another account.

Consumer database engine 140 may receive a query to shared database data 160. Consumer database engine 140 may utilize private network communications to obtain database metadata and access credentials for database data, as indicated at 170. For example, as discussed in detail below with regard to FIG. 4, various private networking techniques, such as techniques that utilize logically isolated network communications (or physically isolated network communications) in order to avoid exposing metadata. In some embodiments, consumer database engine 140 and produce database engine 120 may not communicate directly, but instead through a proxy, as discussed in detail below with regard to FIG. 3. In this way, database engines can be isolated from potentially malicious actions or other failure events.

Figure 11:
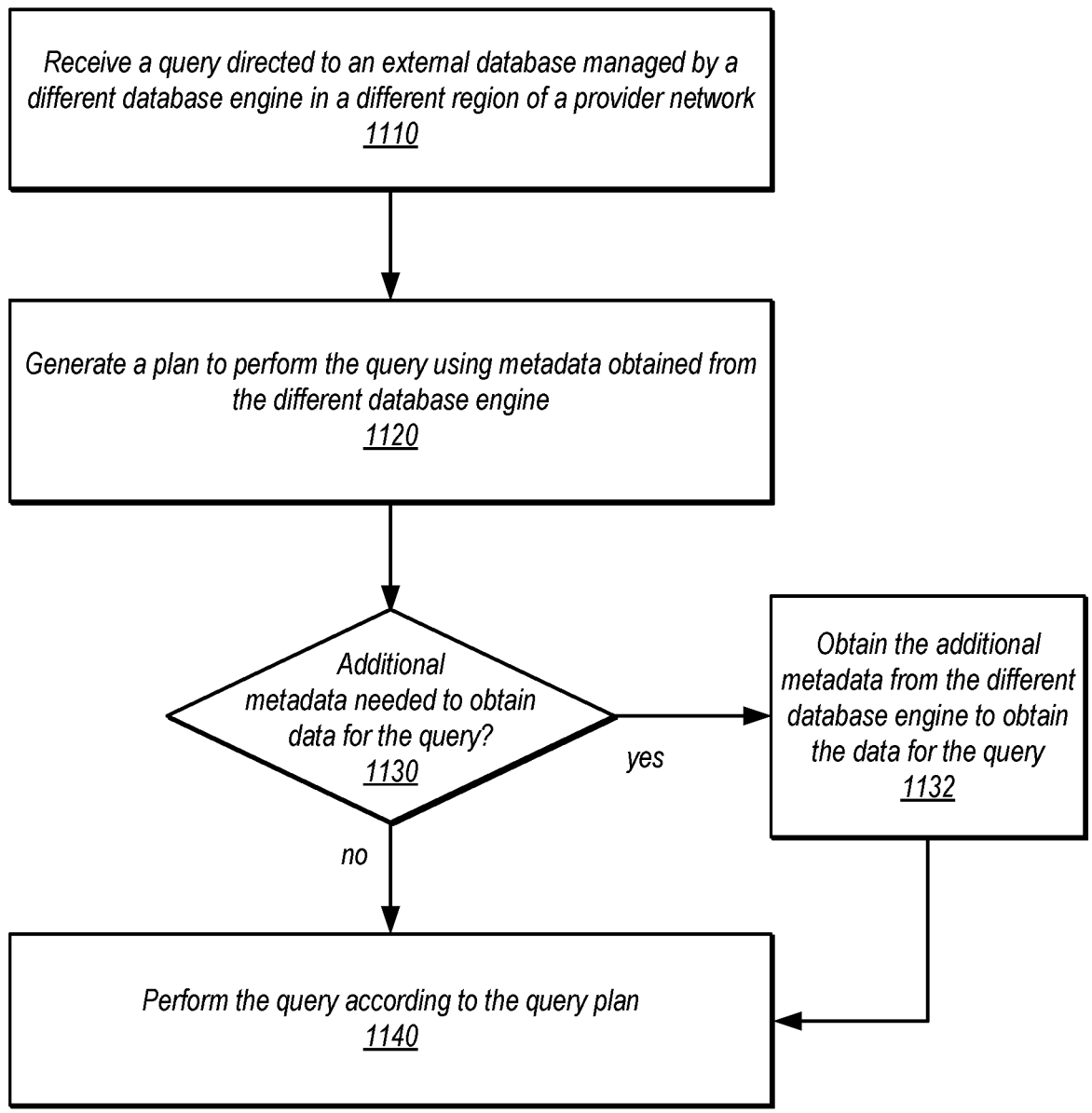
FIG. 11 is a high-level flowchart illustrating methods and techniques to implement obtaining additional metadata from another database engine to perform a query, according to some embodiments.

To perform query 160, consumer database engine 140 may utilize the metadata to generate a query plan to perform the query, including various instructions, operations, or other steps to perform, as discussed in detail below with regard to FIG. 11. Consumer database engine 140 may then access 180 the shared database data 130 in order to perform the query. In some embodiments, consumer database engine 140 may send requests to an implementation of a storage service that stores database data 130 in region 104, which may have cross region access mechanisms that ensure private communications. In some embodiments, consumer database engine 140 may utilize the same private network communication techniques as used for metadata to obtain access to shared database data 130. As discussed in detail below with regard to FIG. 6, cached copies of shared database data 130 may be maintained at consumer database engine 140 and/or within a data store in region 104. Although not illustrated, a result to query 160 may be returned.

Please note that the previous description of a database service is a logical description and thus is not to be construed as limiting as to the implementation of database engines, a database service, database data, regions, and performance of queries, or portions thereof.

This specification continues with a general description of a provider network that implements multiple different services, including a database service and storage service, which may implement privately sharing database data across provider network regions. Then various examples of the database service and storage service, including different components/modules, or arrangements of components/module that may be employed as part of implementing the services are discussed. A number of different methods and techniques to implement privately sharing database data across provider network regions are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
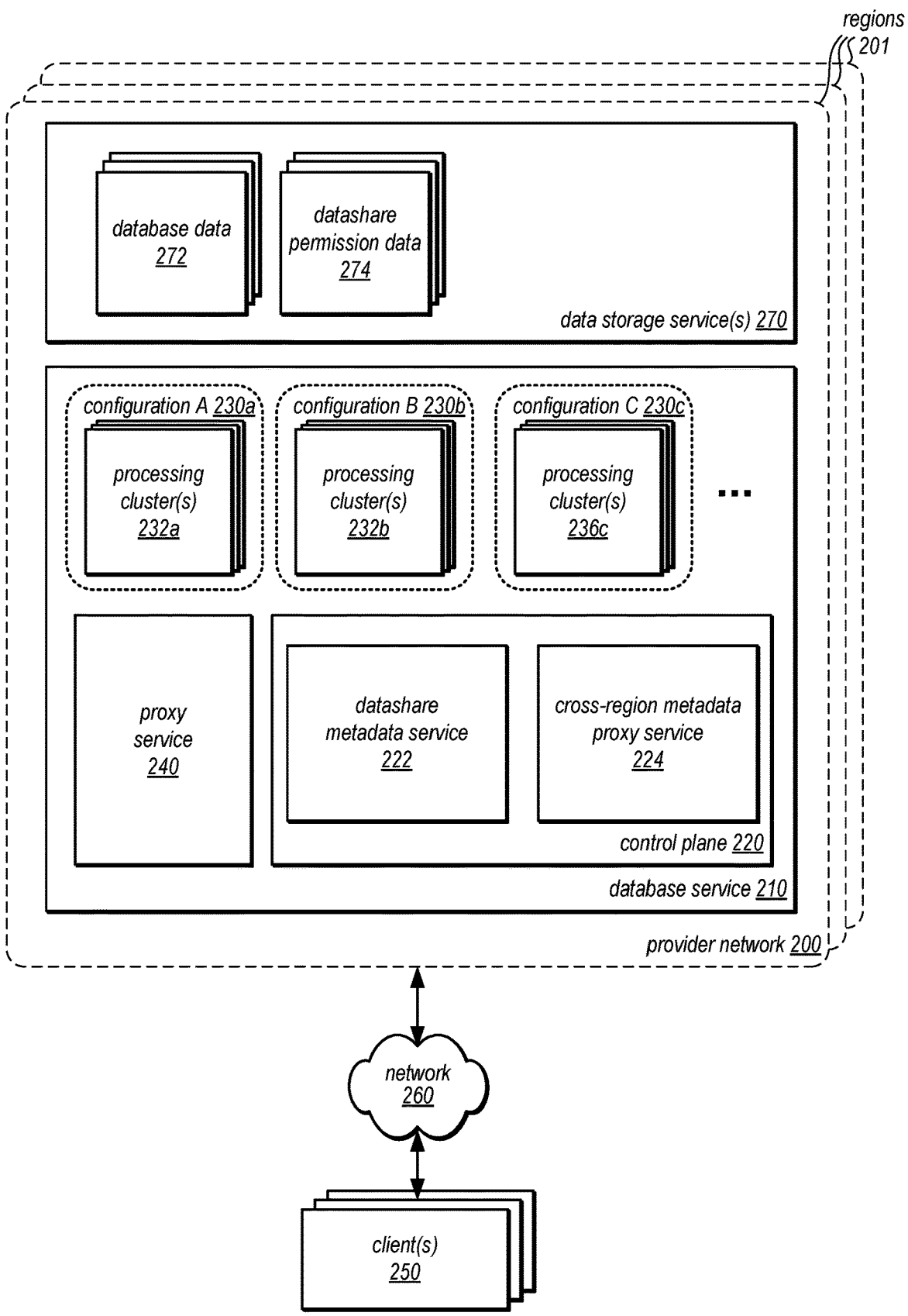
FIG. 2 is a logical block diagram illustrating a provider network offering a database service that privately shares database data across provider network regions, according to some embodiments.

FIG. 2 is a logical block diagram illustrating a provider network offering a database service that privately shares database data across provider network regions, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network 200. The provider network 200 can be formed as a number of regions (e.g., regions 201), where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be (or included in) various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows, database service 210 may be discussed according to the various features or components that may be implemented as part of a data warehouse service, including control plane 220, proxy service 240, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 2000 described below with regard to FIG. 12. Different subsets of these computing devices may be controlled by control plane 220. Control plane 220, for example, may provide a cluster control interface to clients or users who wish to interact with the processing clusters, such as processing cluster(s) 232a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

Control plane 220 may also implement various systems to manage or implement database service 210 features. For example, control plane 220 may implement datashare metadata service 222 and cross-region metadata proxy service 224. As discussed in detail below with regard to FIGS. 3 and 4, these systems may be used to implement datashares accessible across provider network regions 200. Data used to implement these features, such as datashare permission data 274 may be maintained in separate data storage service(s) 270, in some embodiments.

As discussed above, various clients (or customers, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIGS. 3 and 5. For example, multiple users or clients may access a processing cluster to obtain data warehouse services.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

In at least some embodiments, database service 210 may implement proxy service 240 to provide access to databases (e.g., data warehouses) hosted in database service 210. For databases managed by database service 210, database service 210 may provide database endpoints 242 (e.g., network endpoints) for a hosted database. Database endpoints 242 may not provide direct access to a particular processing cluster 232, as the processing cluster used to respond to such requests (e.g., queries) may change according to the various scaling techniques. Instead, client applications may utilize the database endpoint 242 for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications.

Processing clusters, such as processing clusters 232a, 232b, and 232c, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230a, B 230b, and C 230c, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster." Primary clusters 330 may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces.

Generally speaking, clients 250 may encompass any type of client that can submit network-based requests to provider network 200 via network 260, including requests for storage services (e.g., a request to create a datashare at a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
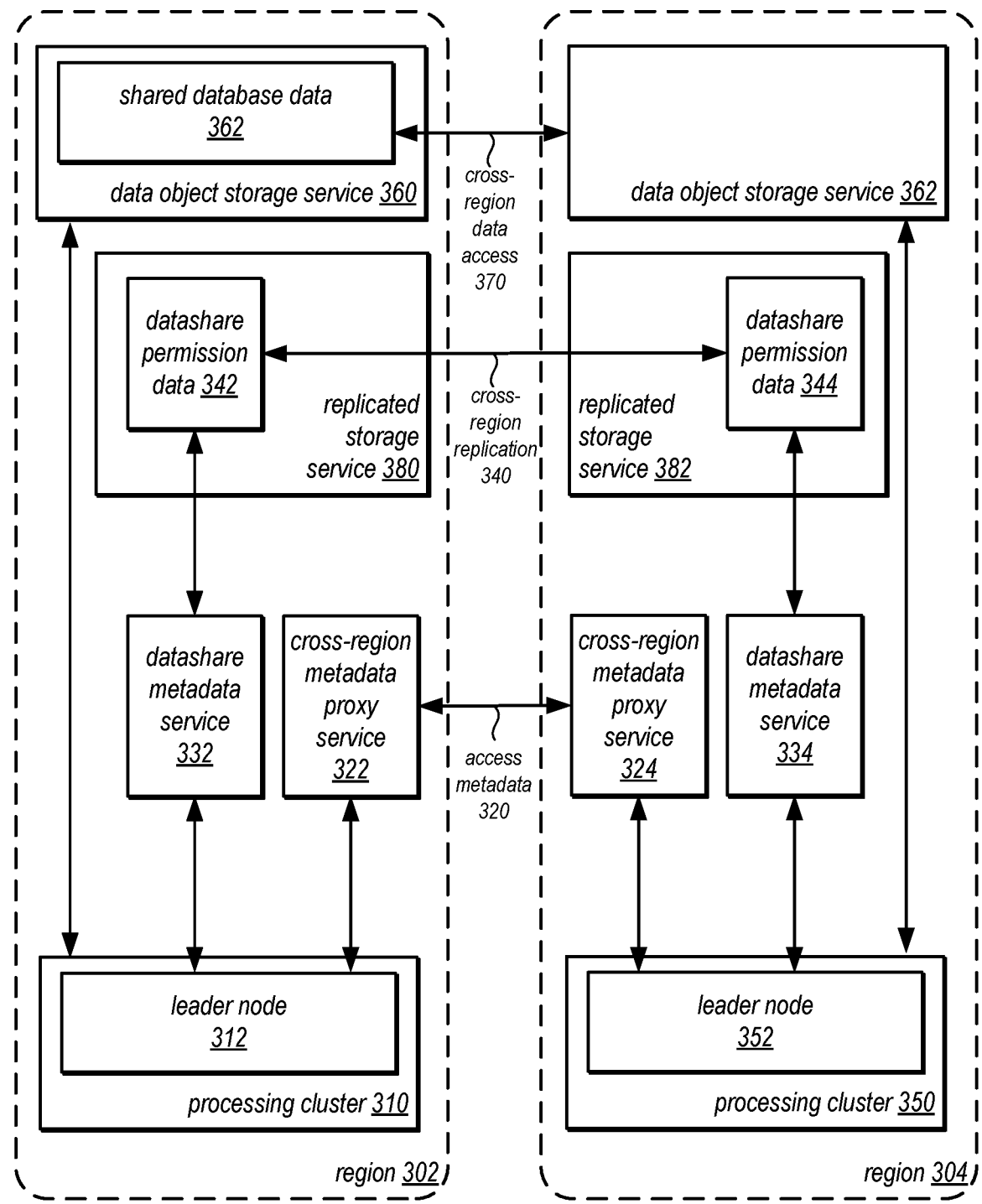
FIG. 3 is a logical block diagram illustrating interactions between control plane components to share database data, according to some embodiments.

FIG. 3 is a logical block diagram illustrating interactions between control plane components to share database data, according to some embodiments. As discussed in detail below with regard to FIG. 7, users may create datashares, grant permission for datashares, accept permissions for datashares, and utilize datashares across provider network regions. In order to support these interactions, different instantiations of database service 210 systems may communicate and work to support these features.

For example, as illustrated in FIG. 3, region 302 and region 304 may have processing clusters 310 and 350, respectively. As discussed in detail below with regard to FIG. 5, these processing clusters may each implement leader nodes, such as leader node 312 and leader node 352, which may support interactions with client applications and other systems, such as control plane systems datashare metadata service 332, cross-region metadata proxy service 322, cross-region metadata proxy service 324, and datashare metadata service 334.

As discussed in detail below with regard to FIG. 7, datashare metadata service 332 in region 302 may manage interactions with datashare permission data 342 and datashare metadata service 334 in region 304 may manage interactions with datashare permission data 342. In this way, requests to create a datashare, authorize accounts, users, organizations, or other entities to access the datashare, conditions or limitations on the datashare (e.g., excluding sharing the data to certain provider network regions), may be read, updated, or otherwise accessed in order to facilitate cross region datashares. As indicated at 340, cross-region replication of datashare permission data 342 and 344 so that the implementations of replicated storage service, 380 and 382, in regions 302 and 304, may utilize a cross-region replication feature (e.g., a global table or other cross region replication feature for database tables or other data objects supported by replicated storage service may be used). Note that many different types of data storage services that replicate across regions may be used.

Figure 4:
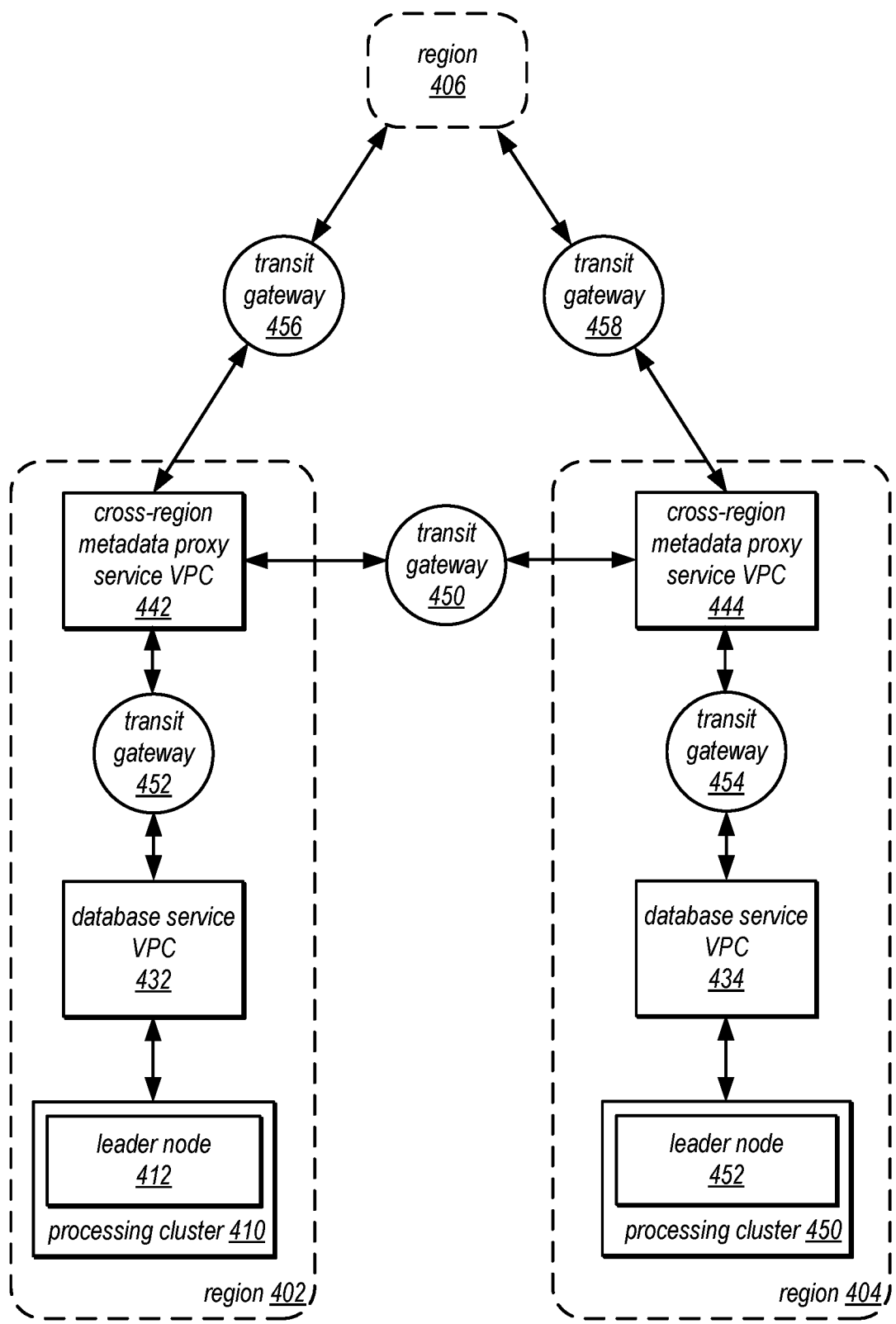
FIG. 4 is a logical block diagram illustrating a network architecture for implementing private communications between leader nodes to share database metadata, according to some embodiments.

As discussed in detail below with regard to FIG. 4, leader nodes, such as leader nodes 312 and 352, may communicate through cross-region metadata proxy services in each region, cross-region metadata proxy service 322 in region 302 and cross-region metadata proxy service 324 in region 304. In this way, metadata may be accessed, as indicated at 320, without providing one cluster with direct access to another cluster, providing security safeguards.

Figure 6:
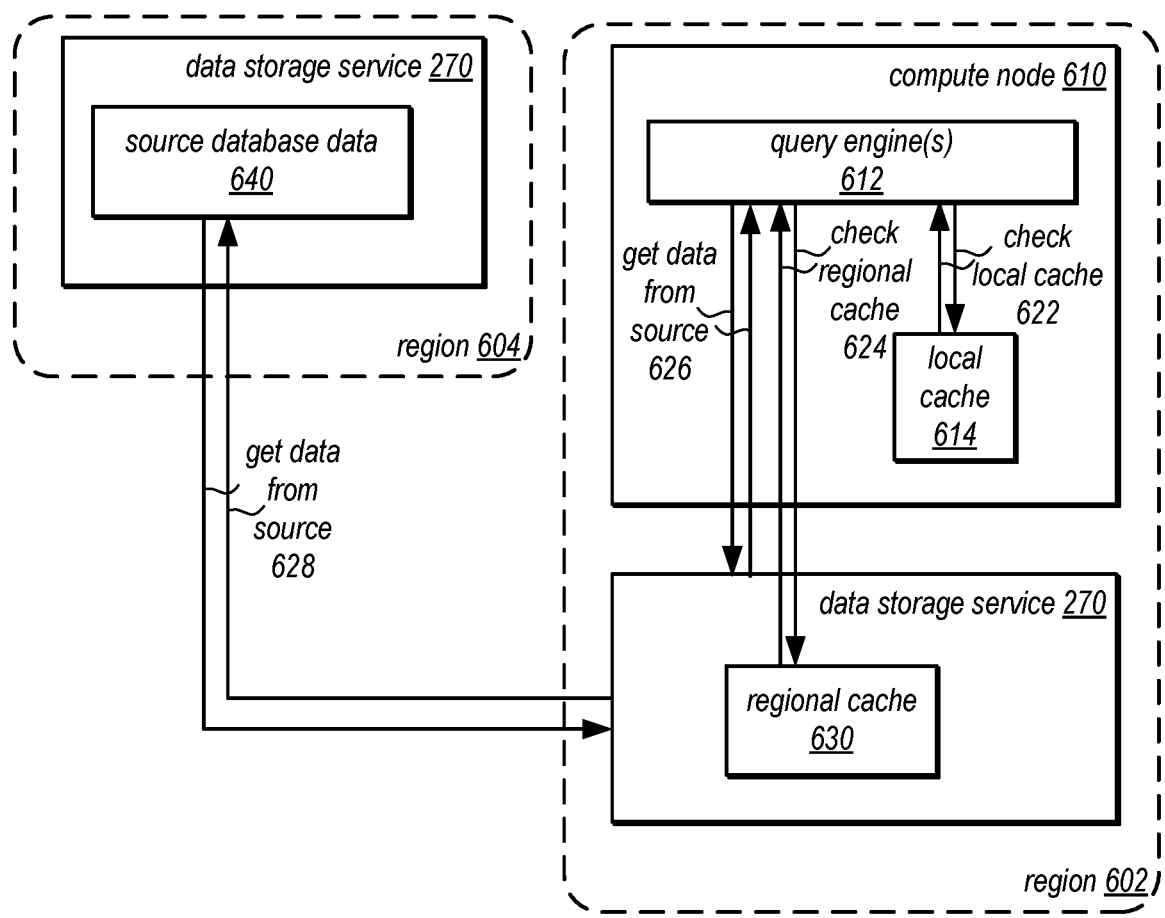
FIG. 6 is a logical block diagram illustrating an example of different caches for database data shared across regions, according to some embodiments.

As discussed in detail below with regard to FIG. 6, shared database data 362 may be stored in data object storage service 360 (e.g., similar to a data storage service 270 discussed above that utilizes an object-based store). Note that other data storage services like those discussed above with regard to data storage service 270 can be used in other embodiments. Cross region data access 370 may be provided to shared database data 362 through requests to data object storage service, at 360 for processing cluster 310, and at 362 for processing cluster 350. When data is used, data object storage service 362 can, for example, requests data blocks or other portions of shared database data 362 to return to processing cluster 350 for use in performing queries.

In order to facilitate cross-region communications, different types of private communication techniques may be implemented. FIG. 4 is a logical block diagram illustrating a network architecture for implementing private communications between leader nodes to share database metadata, according to some embodiments. In FIG. 4, communications between leader nodes 412 and 452 of processing clusters 410 and 450 in regions 402 and 404 may be facilitated through virtual private clouds and transit gateways.

A virtual private cloud (VPC) may be implemented as a logically isolated network within or portion of provider network 200, in order to allow a customer, system, service or user associated to specify the configuration within the portion of the provider network, utilizing features such as specifying a range of network addresses (e.g., via a CIDR block), creation of overlay networks, such as subnets (which may be specified with different CIDR blocks), create and/or manage network route tables, and gateways as well as associate route tables for ingress traffic to a logically isolated network.

A transit gateway, such as transit gateways 450, 452, 454, 456, and 458, may be a virtual traffic hub implemented as part of a network system or service of provider network 200 that may connect to multiple logically isolated networks, which may be programmatically attached in a hub-and-spoke configuration to a transit gateway, in various embodiments, so that the routing/forwarding of network packets from one attached logically isolated network to another is managed by nodes of a transit gateway based on metadata and/or policies provided by the creating/using clients, applications, entities, and/or systems.

Logically isolated networks attached to transit gateway (e.g., indicated by the arrows to transit gateways from VPCs, like VPCs 432, 434, 442, and 444) may allow network configuration settings (e.g., network addresses assigned to resources within a given network, subnet configurations, security settings and the like) to be set independently for the different networks, without having to take other networks' configuration settings into account. For example, a range of isolated network addresses selected for resources within one isolated network may happen to overlap with a range of private network addresses selected for resources within another isolated network in various embodiments, since the two address ranges are selected independently. According to some embodiments, the metadata taken into consideration at a transit gateway set up on behalf of a given client to manage traffic flowing between various isolated networks may include multiple route tables provided by the client (and/or route tables generated at the transit gateway based on other input provided by the client, such as forwarding information base (FIB) entries from which route table entries may be derived.) After the appropriate route tables have been associated and populated with entries, traffic may be allowed to start flowing between the isolated networks via transit gateways in various embodiments.

Utilizing VPCs and transit gateways, private network communications for access metadata and providing access credentials may be implemented while also prevent direct communication between leader nodes 412 and 452. For example, processing cluster 410 may be implemented as part of the database service VPC 432 in region 402, which may utilize transit gateway 452 to route traffic to a VPC for the cross-region metadata proxy service 442 for region 402. Cross-region metadata proxy service 442 may then be attached to different transit gateways attached to corresponding cross-region metadata proxy service VPCs in other regions, such as via transit gateway 456 to region 406 and transit gateway 450 to cross-region metadata proxy service VPC 444 in region 404. Likewise processing cluster 450 may be implemented as part of the database service VPC 434 in region 404, which may utilize transit gateway 454 to route traffic to a VPC for the cross-region metadata proxy service 444 for region 404. Cross-region metadata proxy service 444 may then be attached to different transit gateways attached to corresponding cross-region metadata proxy service VPCs in other regions, such as via transit gateway 458 to region 406 and transit gateway 450 to cross-region metadata proxy service VPC 442 in region 402. Similar network architectures could be implemented for region 406 and further regions, which are not illustrated.

In order to implement cross-region replication, the network architecture may utilize various routing table features of transit gateways. For example, connect any two VPCs in different AWS Regions, as long as they have distinct, non-overlapping CIDR blocks. This ensures that all of the private IP addresses are unique and allows all of the resources in the VPCs to address each other without the need for any form of network address translation. In this embodiment, a special cross-region metadata proxy service cell per region may be created. The cross-region metadata proxy service VPC may still be peered with regional service VPC (e.g., for database service 210 within a region, like VPC 432 and 434), and it will also be peered with cross-region metadata proxy service VPC in all the other regions to form a mesh across all other regions (e.g., as illustrated by the use of transit gateways to peer regions 402, 404, and 406). Each cross-region metadata proxy service VPC may have a unique CIDR range that does not conflict with any other region, in some embodiments.

For determining CIDR allocation, some features of a routing solution may ensure that cross region metadata proxy service VPCs within a region have non overlapping CIDRs, the cross-region metadata proxy service VPC are non-overlapping across all regions, and limit CIDR reservations from a regional service VPC. For example, in some embodiments a reservation of 10.20.0.0/16 from service VPC to be distributed by cross-region metadata proxy service VPC within the region may be made to limit CIDR reservations. Continuing with the example, the lower 3 bits of the third IP decimal may be used to represent the cell ID, e.g. 000->cell 1, 001→cell 2. This leaves room for 8 cross-region metadata proxy service VPC cells in a region. A mapping may be maintained between a region code to the higher 5 bits of the third IP decimal (e.g., region 402→00000, region 404>00001, etc.). This leaves room for 2^5=32 regions. When further regions are added, a reservation of a new/16 CIDR block from a service VPC can be made, providing room for another 32 regions.

Note that other private communication techniques can be utilized, and thus the previous discussion is not intended to be limiting to other private communication techniques between processing clusters.

Figure 5:
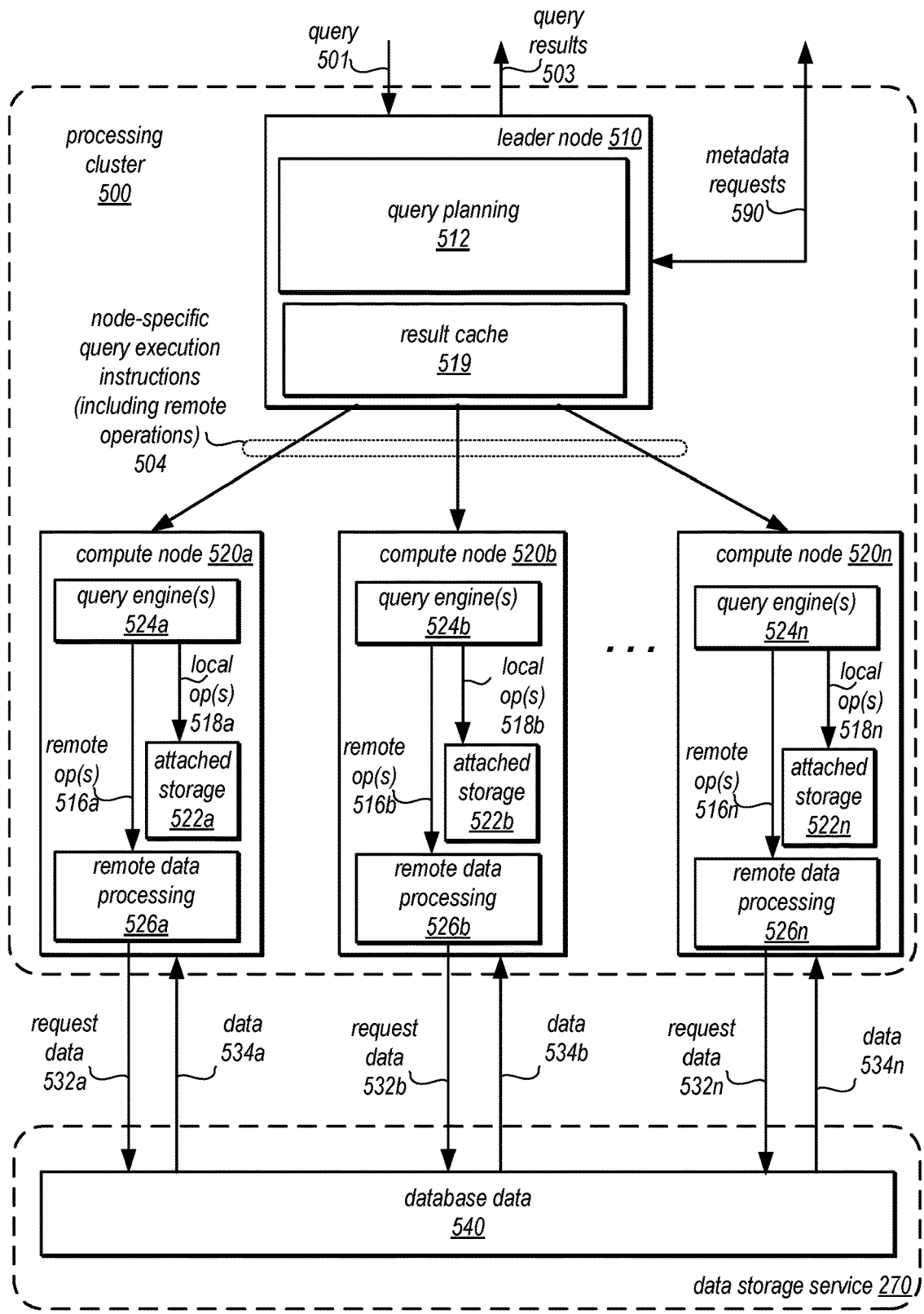
FIG. 5 is a logical block diagram illustrating an example processing cluster of a database service, according to some embodiments.

FIG. 5 is a logical block diagram illustrating an example processing cluster of a database service, according to some embodiments. Processing cluster 500 may be query processing cluster, like processing clusters 232 discussed above with regard to FIG. 2, that distributes execution of a query among multiple computational (which may also be referred to as "compute") nodes. As illustrated in this example, a processing cluster 500 may include a leader node 510 and compute nodes 520a, 520b, and 520n, which may communicate with each other over an interconnect (not illustrated). Leader node 510 may implement query planning 512 to generate query plan(s), query execution 514 for executing queries on processing cluster 500 that perform data processing that can utilize remote query processing resources for remotely stored data (e.g., by utilizing one or more query execution slot(s)/queue(s) 517). As described herein, each node in a primary processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 500 is a leader node as illustrated in FIG. 5, but rather different nodes of the nodes in processing cluster 500 may act as a leader node or otherwise direct processing of queries to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

Leader node 510 may manage communications with clients, such as clients 250 discussed above with regard to FIG. 2. As discussed above with regard to FIG. 3, leader node 510 may communicate with proxy service 240 and may receive query 501 and return query results 503 to proxy service 240 (instead of communicating directly with a client application). Alternatively, in those embodiments where leader node 510 implements database query queue 320 and query routing 330 as a primary cluster, then leader node 510 may act as the proxy for other, secondary clusters, attached to the database, and may return query results directly to a client application.

Leader node 510 may be a node that receives a query 501 from various client programs (e.g., applications) and/or subscribers (users) (either directly or routed to leader node 510 from proxy service 240), then parses them and develops an execution plan (e.g., query plan(s)) to carry out the associated database operation(s)). More specifically, leader node 510 may develop the series of steps necessary to obtain results for the query. Query 501 may be directed to data that is stored both locally within processing cluster 500 (e.g., at one or more of compute nodes 520) and data stored remotely. Leader node 510 may also manage the communications among compute nodes 520 instructed to carry out database operations for data stored in the processing cluster 500. For example, node-specific query instructions 504 may be generated or compiled code by query execution 514 that is distributed by leader node 510 to various ones of the compute nodes 520 to carry out the steps needed to perform query 501, including executing the code to generate intermediate results of query 501 at individual compute nodes may be sent back to the leader node 510. Leader node 510 may receive data and query responses or results from compute nodes 520 in order to determine a final result 503 for query 501.

A database schema, data format and/or other metadata information for the data stored among the compute nodes, such as the data tables stored in the cluster, may be managed and stored by leader node 510. Query planning 512 may account for remotely stored data by generating node-specific query instructions that include remote operations to be directed by individual compute node(s). Although not illustrated, in some embodiments, a leader node may implement burst manager to send 506 a query plan generated by query planning 512 to be performed at another attached processing cluster and return results 508 received from the burst processing cluster to a client as part of results 503. Query planning 512 may rely upon metadata updated via metadata requests 590 to other leader nodes in other regions to perform queries on datashares in other regions. Similarly, leader node 510 may return metadata in response to requests from other leader nodes of processing clusters.

In at least some embodiments, a result cache 519 may be implemented as part of leader node 510. For example, as query results are generated, the results may also be stored in result cache 519 (or pointers to storage locations that store the results either in primary processing cluster 500 or in external storage locations), in some embodiments. Result cache 519 may be used instead of other processing cluster capacity, in some embodiments, by recognizing queries which would otherwise be sent to another attached processing cluster to be performed that have results stored in result cache 519. Various caching strategies (e.g., LRU, FIFO, etc.) for result cache 519 may be implemented, in some embodiments. Although not illustrated in FIG. 5, result cache 519 could be stored in other storage systems (e.g., other storage services, such as a NoSQL database) and/or could store sub-query results.

Processing cluster 500 may also include compute nodes, such as compute nodes 520a, 520b, and 520n. Compute nodes 520, may for example, be implemented on servers or other computing devices, such as those described below with regard to computer system 2000 in FIG. 12, and each may include individual query processing "slices" defined, for example, for each core of a server's multi-core processor, one or more query processing engine(s), such as query engine(s) 524a, 524b, and 524n, to execute the instructions 504 or otherwise perform the portions of the query plan assigned to the compute node. Query engine(s) 524 may access a certain memory and disk space in order to process a portion of the workload for a query (or other database operation) that is sent to one or more of the compute nodes 520. Query engine 524 may access attached storage, such as 522a, 522b, and 522n, to perform local operation(s), such as local operations 518a, 518b, and 518n. For example, query engine 524 may scan data in attached storage 522, access indexes, perform joins, semi joins, aggregations, or any other processing operation assigned to the compute node 520.

Query engine 524a may also direct the execution of remote data processing operations, by providing remote operation(s), such as remote operations 516a, 516b, and 516n, to remote data processing clients, such as remote data processing client 526a, 526b, and 526n. Remote data processing clients 526 may be implemented by a client library, plugin, driver or other component that sends request sub-queries to be performed by data storage service 220 or requests to for data, 532a, 532b, and 532n. As noted above, in some embodiments, remote data processing clients 526 may read, process, or otherwise obtain data 534a, 534b, and 534c, in response from database data 540 in data storage service 270, which may further process, combine, and or include them with results of location operations 518. This database data 540 may, in some embodiments, be a datashare in another region of provider network 200, as discussed in detail below with regard to FIG. 6.

Compute nodes 520 may send intermediate results from queries back to leader node 510 for final result generation (e.g., combining, aggregating, modifying, joining, etc.). Remote data processing clients 526 may retry data requests 532 that do not return within a retry threshold.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

As noted earlier in FIGS. 3 and 5, processing clusters may access shared database data in other regions. FIG. 6 is a logical block diagram illustrating an example of different caches for database data shared across regions, according to some embodiments. In some embodiments, a caching strategy may be implemented to reduce cross-region traffic (while still obtaining consistent data). For example, metadata obtained for a query may indicate whether or not data for the query in the shared database data has been updated. If not, then a cached version may be used. For example, a local cache 614 may be maintained on a compute node 610 of a processing cluster in region 602. Query engine 612 which performs the query instructions received from a leader node, may first check 622 local cache 614 for the data (which may have been stored there in a previous query).

If not, then query engine(s) 612 may check regional cache 630, which may be a cache maintained in data storage service 270 in region 602. This regional cache 630 could have been updated by other processing clusters that also have access to the data share in region 602. If not, then query engine(s) 612 may send requests(s) to get data from the source 626 to data storage service 270, which may use cross-region transfer techniques to access source database data 640 at data storage service 270 in region 604 and return the request data via data storage service 270 in region 602 to query engine(s) 612. In some embodiments, when a cache hit occurs, a time to live (TTL) for the data (e.g., requested data block) is reset. In this way, data that is actually accessed may remain in the caches. In some embodiments, caches 630 and/or 614 can be pre-warmed, by proactively obtaining data blocks (or other portions of shared database data) that are likely to be accessed (e.g., based on historical usage data).

Figure 7:
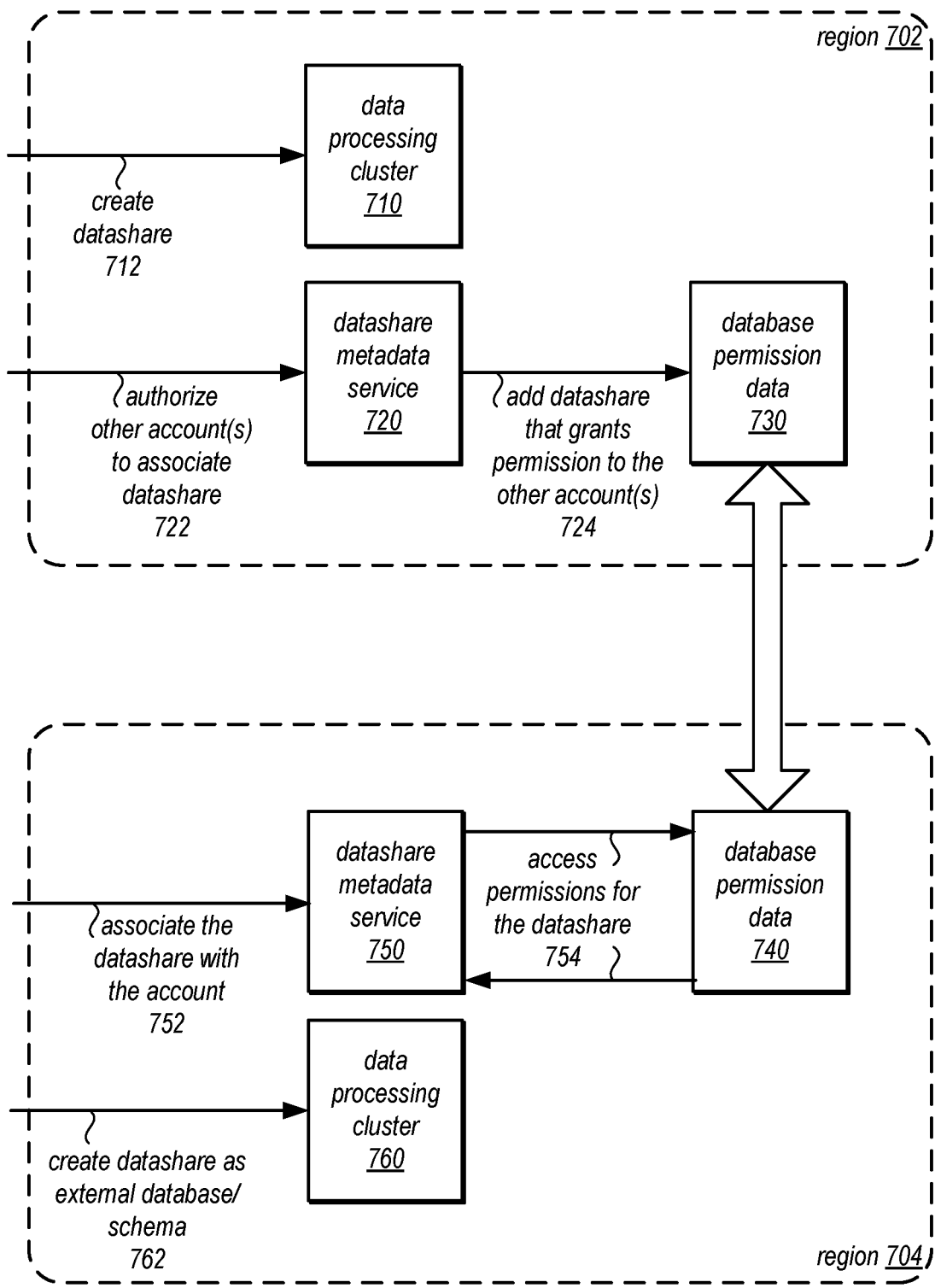
FIG. 7 is a logical block diagram illustrating interactions to create and use datashares for database data across provider network regions, according to some embodiments.

FIG. 7 is a logical block diagram illustrating interactions to create and use datashares for database data across provider network regions, according to some embodiments. Region 702 may host data processing cluster 710, which may manage a database. Data processing cluster 710 may receive a request to create datashare 712, which may allow data processing cluster 710 to respond to requests for metadata and access credentials for database data. Request 712 may be received through an interface that communicates with data processing cluster 710 (e.g., a command line or other data plane interface or programmatic interface, such as an interface that may also accept queries and other data access requests. For example, a SQL or other query language-like command may be performed similar to the example below:
 CREATE DATASHARE Salesshare;
 GRANT USAGE ON DATASHARE Salesshare
  TO ACCOUNT '123456789012';

As illustrated at 722, a request to authorize other account(s) to associate the datashare may be received at datashare metadata service 720 in region 702. For example, a command line, administrator console, or other control plane interface may be used to identify the accounts and the data share to be associated. Various permissions, including limitations on the consumer regions that can access the datashare may be specified as part of the authorization request. Below is an example of an authorization command that may be performed:
 db_service authorize-data-share
  --data-share-id  id:db_service:regionA:{PRODUCER_ACCOUNT}: datashare: {PRODUCE
  --consumer-identifier 123456789012

In some embodiments, once the producer calls authorize-DataShare, it enables the consumer (e.g., a principal/user/or identity for the account) to accept the share authorization in any provider network region. The producer may not have any control over how the datashare is used by consumer, so when it authorizes the data share, consumer principal can accept it in any region and associate to any processing cluster. In other embodiments, limitations or controls may be applied as part of authorization (e.g., limiting datashare to particular regions or excluding particular regions). Datashare metadata service 720 may in turn update database permission data 730, as indicated 724, which may be replicated to region 704 in database permission data 740.

As indicated at 752, a request in region 704 to datashare metadata service 750 may be received to associate the datashare with the account, in some embodiments. Datashare metadata service 750 may access 754 database permission data 740 in order to determine whether the association may proceed (e.g., yes, no because not authorized, no because an unauthorized region, etc.). Below is an example association request:
 db_service associate-data-share-consumer
 --data-share-id
 id:db_service:regionA:{PRODUCER_ACCOUNT}:
  datashare:{PRODUCE
 --associate-entire-account #Optional param
 --consumer-region 'regionB' #Optional param
 --consumer-namespace   'id:db_service:regionB:
  234567890123: namespace:55555555-

Datashare can be associated in all (available) regions, or in particular ones identified in the request, as illustrated above. Request 752 may be received via a command line, administrator console, or other control plane interface.

As indicated at 762, a request to create a datashare as an external database or schema at data processing cluster 760 may be received. Request 762 may be received through an interface that communicates with data processing cluster 710 (e.g., a command line or other data plane interface or programmatic interface, such as an interface that may also accept queries and other data access requests. Below is an example request and query:
 CREATE DATABASE Sales_db from DATASHARE Salesshare
  OF ACCOUNT' {PRODUCER_ACCOUNT}
 SELECT*from Sales_db.public.t1;

Although FIGS. 2-7 have been described and illustrated in the context of a provider network implementing a database service, like a data warehousing service, the various components illustrated and described in FIGS. 2-7 may be easily applied to other database engines that are hosted in different regions of a provider network. As such, FIGS. 2-7 are not intended to be limiting as to other embodiments of privately sharing database data across provider network regions.

FIG. 8 is a high-level flowchart illustrating methods and techniques to implement privately sharing database data across provider network regions, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 810, a consumer database engine hosted in a first region of a provider network may be create as an external database a database managed by a producer database engine hosted in a second region of a provider network, as an external database accessible via the consumer database engine, in some embodiments. For example, the consumer database engine may be similar to consumer database engine 140 in FIG. 1 above, implemented as a single node or distributed database engine (e.g., as a processing cluster). The consumer database engine may have been associated with the database (e.g., as part of a datashare association request) in order to grant permission to the consumer database engine to access the database, in some embodiments.

As indicated at 820, the consumer database engine may obtain via private network communications between the first region and the second region, metadata describing the database from the producer database engine and an access credential to access the database, in some embodiments. For example, the metadata may include various schema information (e.g., numbers of columns, data types of columns, statistics or other information descriptive of columns). The access credential may be an encryption key, authorization token, and/or any other information necessary to obtain access to the database data.

Perform, by the consumer database engine, a query to the external database received at the consumer database engine using the metadata and the access credential, as indicated at 830. For example, as discussed in detail below with regard to FIG. 11, the metadata may be used to plan query operations to access the shared database data and the access credential used when making requests to obtain the database data identified in the planned query operations. A result for the query may be returned, in various embodiments.

Although the techniques described above with regard to FIG. 8, were describe with respect to creating the database as an external database. In some embodiments, the database may be created as an external schema. A schema, as discussed above may be described by the metadata that is received from the producer database engine, which may include various information used to understand the database when accessed by the consumer database engine. However, when utilizing the schema, the different database data (e.g., stored in the provider network region of the producer database engine or another location internal to or external to the provider network). Therefore, the external schema may be used to perform queries to the other data as the database (e.g., using the same layout of columns, column types, etc.).

Figure 9:
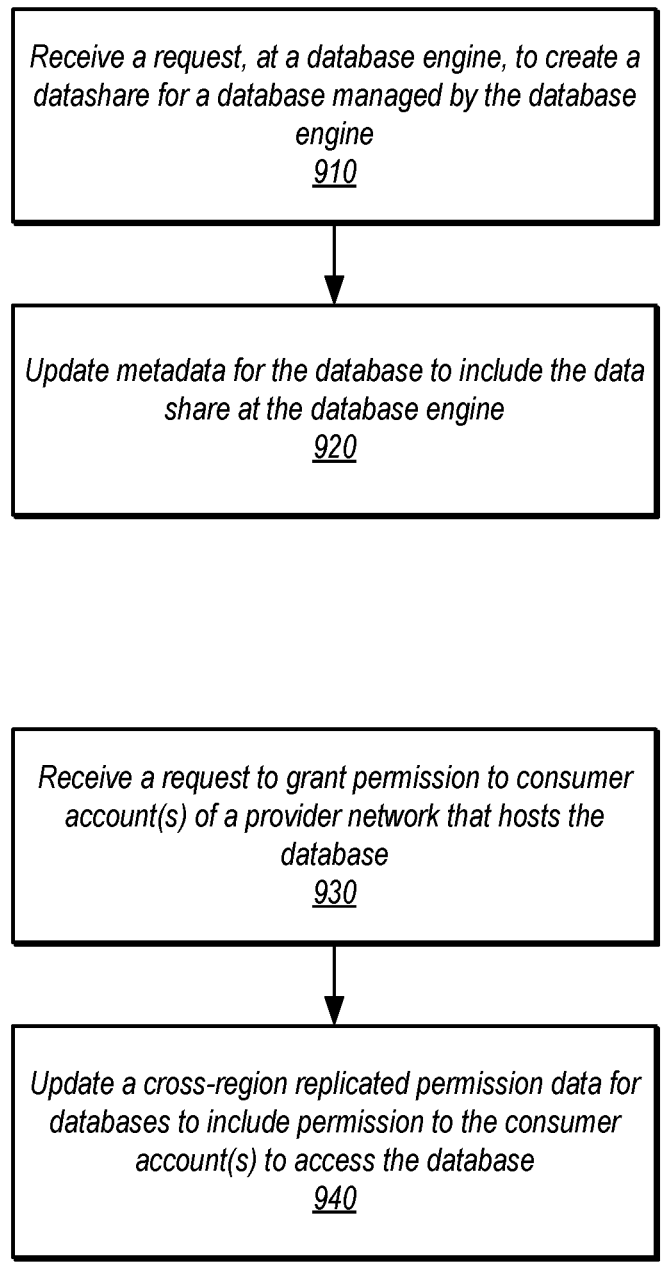
FIG. 9 is a high-level flowchart illustrating methods and techniques to implement creating a datashare for a producer's database, according to some embodiments.

FIG. 9 is a high-level flowchart illustrating methods and techniques to implement creating a datashare for a producer's database, according to some embodiments. A producer database engine may handle requests to create a datashare, in some embodiments. As indicated 910, a request may be received at a database engine to create a datashare for a database managed by the database engine. As discussed above with regard to FIG. 7, the request may identify a table (or tables) or various other identifiers of a data set to be shared along with an account identifier, in some embodiments. As indicated at 920, the metadata for the database may be updated to include the data share at the database engine, in some embodiments. For example, access permissions, data catalogs, and/or various other internal metadata at the query engine may be updated to allow access requests for metadata and access credentials to share a database, in some embodiments.

As indicated at 930, a request to grant permission to consumer account(s) of a provider network that hosts the database may be received. As discussed above with regard to FIG. 7, the permission grant requests may be received through a control plane of a database service and may include identifiers or other information to identify the permitted accounts. In some embodiments, limitations on sharing such as region limitations (e.g., allowed regions or excluded regions, allowed users/roles in accounts or excluded users/roles in accounts, etc.) may be specified in the request. As indicated at 940, an update may be made to a cross-region replicated permission data for databases to include the permission to the consumer account(s) to access the database, in some embodiments.

Figure 10:
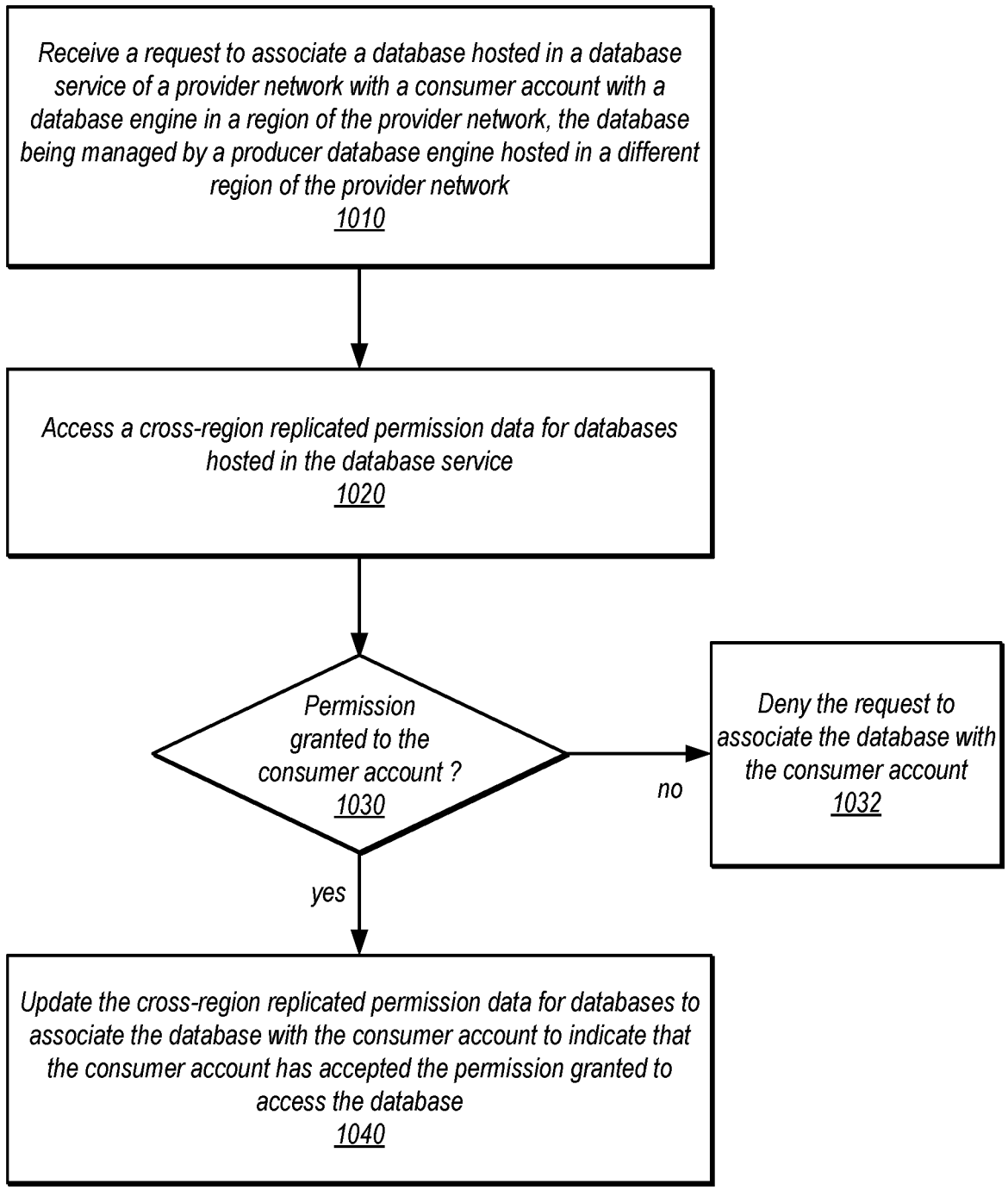
FIG. 10 is a high-level flowchart illustrating methods and techniques to implement associating a datashare with a consumer, according to some embodiments.

Datashare permissions may be enforced, in some embodiments, when requests are made to associate a shared database are received. FIG. 10 is a high-level flowchart illustrating methods and techniques to implement associating a datashare with a consumer, according to some embodiments. As indicated at 1010, a request to associate a database hosted in a database service of a provider network with a consumer account with a database engine in a region of the provider network may be received. The database may be managed by a producer database engine hosted in a different region of the provider network. As indicated at 1020, a cross-region replicated permission data for databases hosted in the database service may be accessed. For example, an identifier for the database (e.g., a datashare identifier) may be accessed.

As indicated at 1030, a determination may be made as to whether permission is granted to the consumer account. For example, an account identifier may be compared with allowed accounts in the permission data share. In some embodiments, further authorization criteria may apply. For example, the region to associate the database with (of the consumer) may be limited to particular regions (or particular regions excluded). Similarly, particular users (or roles of users, such as admin, security, developer, etc.) may be explicitly allowed or denied).

If permission is not granted, then the request to associate the database with the consumer account may be denied, as indicated at 1032. If granted, then as indicated at 1040, the cross-region replicated permission data may be updated to indicate that the consumer account has accepted the permission granted to access the database, in some embodiments.

Once associated and created as an external database, queries can be performed from the consumer database engine to the shared database. FIG. 11 is a high-level flowchart illustrating methods and techniques to implement obtaining additional metadata from another database engine to perform a query, according to some embodiments. As indicated at 1110, a query directed to an external database managed by a different database engine in a different region of a provider network may be received. The query may include as a feature of a the query (e.g., the "FROM" clause) the external database name. As indicated at 1120, a plan to perform the query may be generated using metadata obtained from the different database engine. For example, various table schemas may be used to determine which portions of data to scan, various statistics may be used to estimate the cost of different alternative orderings of operations (e.g., join orders, when to perform filters or aggregations, etc.), and which blocks or data can be pruned or skipped (e.g., using min and max values for data blocks in a superblock). In some embodiments, additional metadata may be needed to obtain data for the query, as indicated at 1130. In such scenarios, the additional metadata may be obtained from the different database engine (e.g., using the private communication techniques discussed above). In some embodiments, the query plan may be updated as a result. As indicated at 1140, the query may then be performed according to the query plan.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of privately sharing database data across provider network regions as described herein may be executed on one or more computer systems, which may interact with various other devices. One such computer system is illustrated by FIG. 12. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

Figure 12:
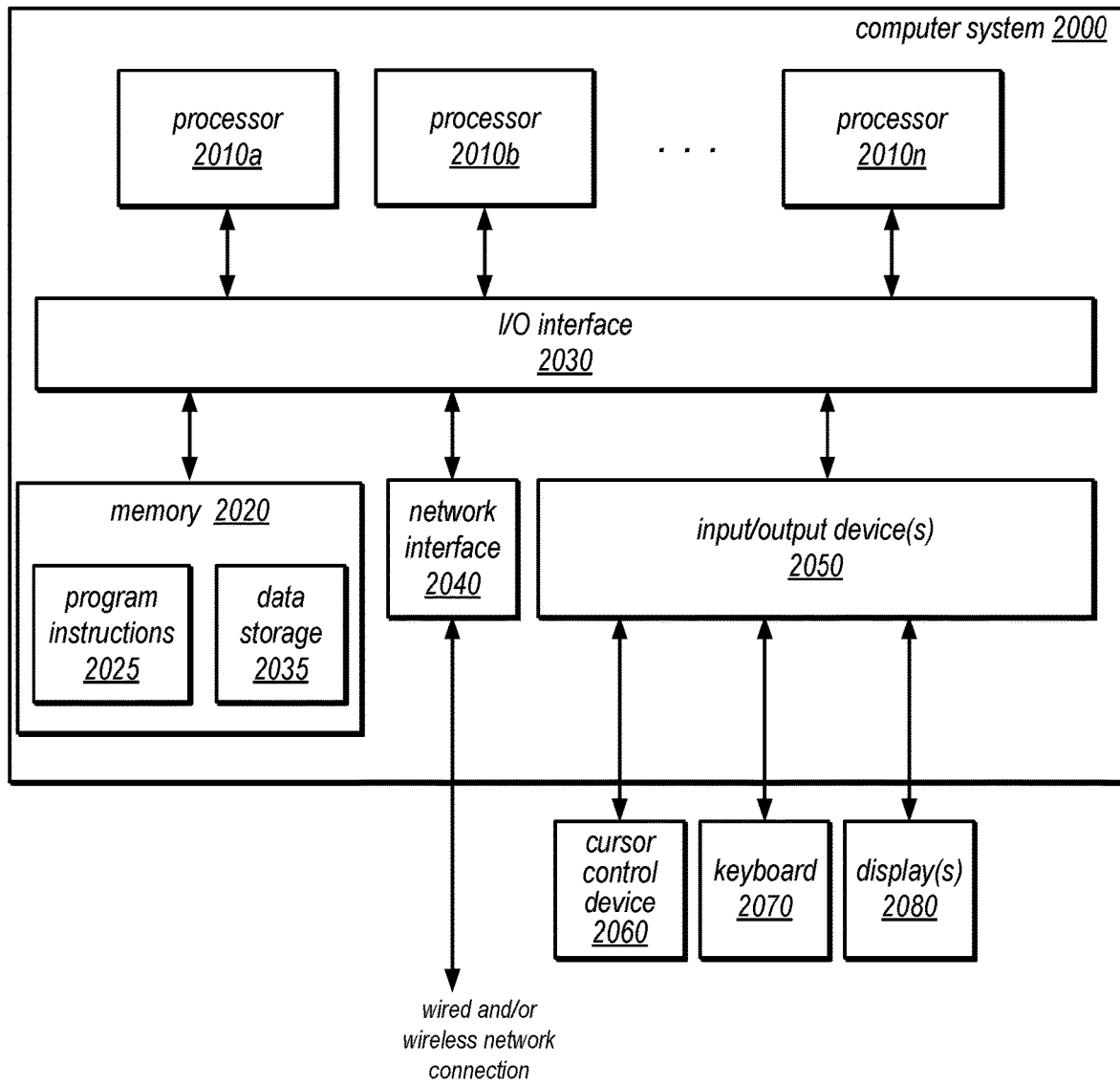
FIG. 12 illustrates an example system that implements the various methods, techniques, and systems described herein, according to some embodiments.

As shown in FIG. 12, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a plurality of computing devices, respectively comprising at least one processor and a memory, that implement a database service of a provider network;
    wherein the database service comprises a control plane, a producer database engine, and a consumer database engine;
    wherein the control plane is configured to:
        receive a request to share read-only access to a database managed by a producer database engine hosted in a first region of the provider network with a consumer database engine hosted in a second region of the provider network; and
        associate the database with the consumer database engine to confirm the shared read-only access;
    wherein the consumer database engine, is configured to:
        receive a request to create the database as an external database accessible via the consumer database engine;
        create the database as the external database;
        obtain, using private network communications through respective control plane proxies hosted separately from the producer database engine and the consumer database engine in different logically isolated networks from further logically isolated networks of the producer database engine and the consumer database engine in the first region and the second region of the provider network with cross-region access to provide indirect communication between the producer database engine and the consumer database engine in accordance with the association established in the control plane between the database and the consumer database engine, metadata from the producer database engine and an access credential to access the database, wherein the metadata comprises respective schemas of one or more database tables and respective statistics descriptive of content of the one or more database tables, and wherein the cross-region access between the first region and the second region is performed via a virtual traffic hub that connects the different logically isolated networks for communicating metadata across regions using the respective control plane proxies; and
        use the metadata and the access credential to perform a query to the external database.

2. The system of claim 1, wherein the producer database engine is configured to receive a request to create a datashare from the database.

3. The system of claim 1,
    wherein data for the database is stored in a data storage service that is implemented in the first region and the second region; and
    wherein to use the metadata and the access credential to perform a query to the external database, the consumer query engine is configured to obtain at least a portion of data from the database to perform the query via a request to the data storage service in the first region, wherein the data storage service in the first region obtains the portion of data from the data storage service in the second region and returns the portion of data to the consumer query engine.

4. The system of claim 1, wherein the database service is a data warehouse service, wherein the producer query engine and the consumer query engine are respective processing clusters implemented as part of the data warehouse service, and wherein data for the database is stored in a data storage service that is implemented in the first region and the second region.

5. A method, comprising:
    creating, by a consumer database engine hosted in a first region of a provider network, a database, managed by a producer database engine hosted in a second region of a provider network, as an external database accessible via the consumer database engine, wherein the consumer database engine is associated with the database to grant permission to the consumer database engine to access the database;
    obtaining, by the consumer database engine via private network communications between the first region and the second region of the provider network using respective control plane proxies hosted separately from the producer database engine and the consumer database engine in different logically isolated networks from further logically isolated networks of the producer database engine and the consumer database engine in the first region and the second region of the provider network with cross-region access to provide indirect communication between the producer database engine and the consumer database engine, metadata from the producer database engine and an access credential to access the database, wherein the metadata comprises respective schemas of one or more database tables and respective statistics descriptive of content of the one or more database tables, and wherein the cross-region access between the first region and the second region is performed via a virtual traffic hub that connects respective logically isolated networks for communicating metadata across regions using the respective control plane proxies; and
    performing, by the consumer database engine, a query to the external database received at the consumer database engine using the metadata and using the access credential.

6. The method of claim 5, further comprising:
    authorizing, by a control plane of the database service in the second region of the provider network, an account associated with the consumer database engine to access the database responsive to a request to grant permission to the account received at the control plane from a different account associated with the producer database engine.

7. The method of claim 6, wherein the request to grant permission included a limitation on provider network regions that could access the database.

8. The method of claim 6,
wherein authorizing the account associated with the consumer database engine to access the database comprises updating permission data replicated from the second region to the first region and
wherein the method further comprises:
prior to creating the database as an external database, receiving a request to associate the account with the database; and
determining that the association may be performed based on an evaluation of the permission data replicated to the first region of the provider network.

9. The method of claim 5, wherein performing the query to the external database received at the consumer database engine using the metadata and the access credential comprises:
generating a plan to perform the query using the metadata; and
executing the query plan.

10. The method of claim 8, wherein performing the query to the external database received at the consumer database engine using the metadata and the access credential further comprises obtaining additional metadata from the producer database engine to perform the query via the private network communications.

11. The method of claim 5, wherein data for the database is stored in a data storage service that is implemented in the first region and the second region, and wherein performing the query to the external database received at the consumer database engine using the metadata and the access credential comprises obtaining at least a portion of data from the database to perform the query from a cache maintained in the data storage service in the first region.

12. The method of claim 5, wherein performing the query to the external database received at the consumer database engine using the metadata and the access credential comprises obtaining at least a portion of data from the database to perform the query from a local cache of the consumer database engine.

13. The method of claim 5, further comprising:
creating, by second consumer database engine hosted in the first region of the provider network, a second database, managed by a second producer database engine hosted in the second region of the provider network, as an external database schema accessible via the second consumer database engine, wherein the second consumer database engine is associated with the second database to grant permission to the second consumer database engine to access the second database;
obtaining, by the second consumer database engine via private network communications between the first region and the second region of the provider network, metadata describing the second database from the second producer database engine; and
performing, by the second consumer database engine, a second query using the external database schema received at the consumer database engine as part of the metadata.

14. One or more non-transitory, computer-readable storage media, storing program instructions that when executed on or across one or more computing devices cause the one or more computing devices to implement:
receiving, at a consumer database engine hosted in a first region of a provider network, a request to create a database as an external database accessible via the consumer database engine, wherein the database is managed by a producer database engine hosted in a second region of the provider network, wherein the consumer database engine is associated with the database to grant permission to the consumer database engine to access the database;
creating, by the consumer database engine, the database as the external database;
obtaining, by the consumer database engine via private network communications between the first region and the second region of the provider network using respective control plane proxies hosted separately from the producer database engine and the consumer database engine in different logically isolated networks from further logically isolated networks of the producer database engine and the consumer database engine in the first region and the second region of the provider network with cross-region access to provide indirect communication between the producer database engine and the consumer database engine, metadata from the producer database engine and an access credential to access the database, wherein the metadata comprises respective schemas of one or more database tables and respective statistics descriptive of content of the one or more database tables, and wherein the cross-region access between the first region and the second region is performed via a virtual traffic hub that connects the different logically isolated networks for communicating metadata across regions using the respective control plane proxies; and
using, by the consumer database engine, the metadata and the access credential to perform a query to the external database received at the consumer database engine.

15. The one or more non-transitory, computer-readable storage media of claim 14, wherein the consumer database engine was granted permission responsive to a request to grant permission to an account associated with the consumer database engine received at the control plane from a different account associated with the producer database engine.

16. The one or more non-transitory, computer-readable storage media of claim 14, wherein, in using the metadata and the access credential to perform the query to the external database received at the consumer database engine, the program instructions cause the one or more computing devices to implement:
generating a plan to perform the query using the metadata; and
executing the query plan.

17. The one or more non-transitory, computer-readable storage media of claim 14, wherein the first region was authorized to access the database as part of a request to associate the database with an account associated with the consumer database engine.

18. The one or more non-transitory, computer-readable storage media of claim 14,
wherein data for the database is stored in a data storage service that is implemented in the first region and the second region; and
wherein, in using the metadata and the access credential to perform the query to the external database received at the consumer database engine, the program instructions cause the one or more computing devices to implement obtaining at least a portion of data from the database to perform the query from a cache maintained in the data storage service in the first region.

19. The one or more non-transitory, computer-readable storage media of claim 14,
wherein data for the database is stored in a data storage service that is implemented in the first region and the second region; and
wherein, in using the metadata and the access credential to perform the query to the external database received at the consumer database engine, the program instructions cause the one or more computing devices to implement obtaining at least a portion of data from the database to perform the query via a request to the data storage service in the first region, wherein the data storage service in the first region obtains the portion of data from the data storage service in the second region and returns the portion of data to the consumer query engine.

20. The one or more non-transitory, computer-readable storage media of claim 14, wherein the database service is a data warehouse service, wherein the consumer query engine and the producer query engine are respective processing clusters implemented as part of the data warehouse service, and wherein data for the database is stored in a data storage service that is implemented in the first region and the second region.

* * * * *